United States Patent

Wiegand

[15] 3,645,016
[45] Feb. 29, 1972

[54] SHOCK ABSORBER DEMONSTRATION STAND

[72] Inventor: John A. Wiegand, Northbrook, Ill.
[73] Assignee: Maremont Corporation, Chicago, Ill.
[22] Filed: Aug. 11, 1970
[21] Appl. No.: 62,798

[52] U.S. Cl. ............................................................. 35/50
[51] Int. Cl. ..................................................... G09b 25/00
[58] Field of Search .................................................. 35/49, 50

[56] References Cited

UNITED STATES PATENTS 1,627,125  5/1927  Stuart ........................................ 35/50
3,444,629  5/1969  Ward ......................................... 35/50

Primary Examiner—Harland S. Skogquist
Attorney—Cushman, Darby & Cushman

[57] ABSTRACT

A shock absorber demonstration stand having a frame and a movable lever arm, a plurality of shock absorbers are mounted on the frame and are compressible upon actuation of the lever arm and restored to their uncompressed state by a spring, the difference in rates of decompression being represented by the angle of tilt assumed by a bar connecting the ends of the shock absorbers.

9 Claims, 4 Drawing Figures

Patented Feb. 29, 1972
3,645,016
2 Sheets-Sheet 1
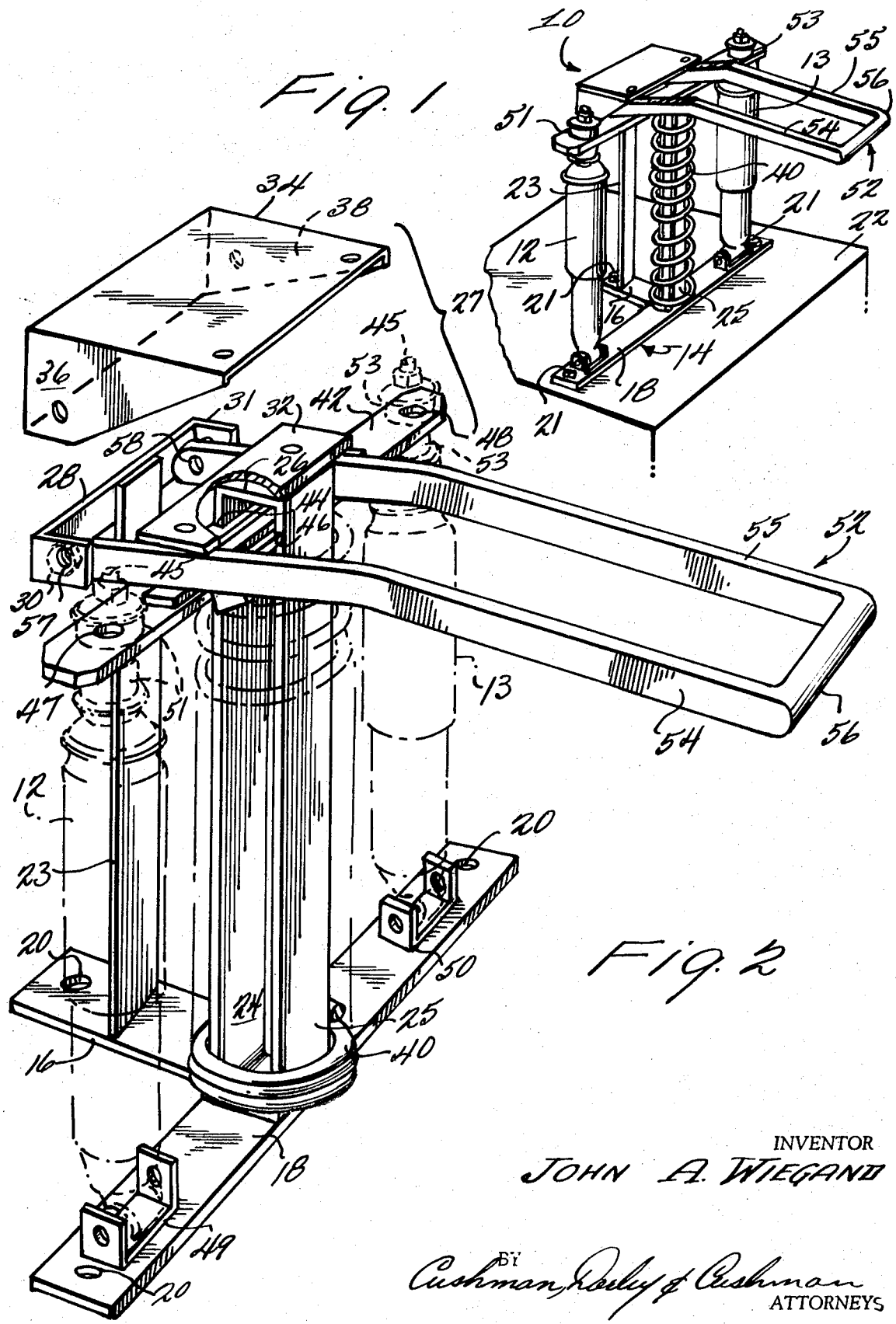
INVENTOR
JOHN A. WIEGAND
BY Cushman, Darby & Cushman
ATTORNEYS

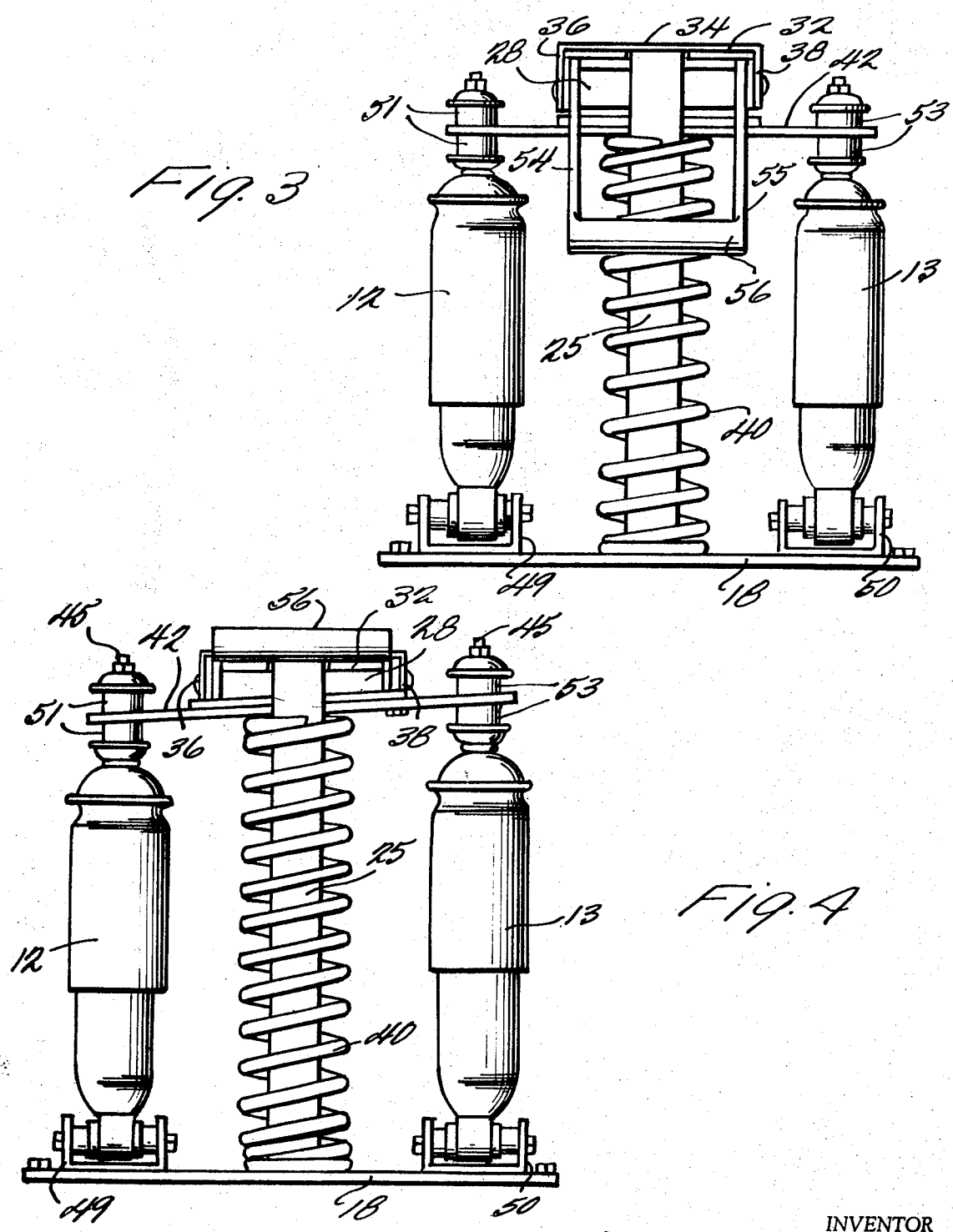

SHOCK ABSORBER DEMONSTRATION STAND

BACKGROUND OF THE INVENTION

This invention relates to demonstration stands for vehicular shock absorbers where the damping characteristics of one or more shock absorbers may be exhibited. More specifically, the demonstration stand of the present invention enables a user of the device to actuate shock absorbers in a manner analogous to their actual operation and to visually observe any differences in function between a plurality of shock absorbers mounted on the stand.

Manufacturers of automotive shock absorbers have long realized that shock absorbers do not suddenly lose their effectiveness in cushioning and damping vibrations of suspension springs. On the contrary, it has been recognized that the decrease in effectiveness of a shock absorbing device of the telescoping barrel type is so gradual that, where a single individual has operated a vehicle equipped with such shock absorbers, the ineffectiveness of the shock absorbers used under normal road conditions may never become apparent to the driver. This circumstance is brought about, of course, by the fact that the slow rate of decrease in effectiveness allows the driver to gradually become accustomed to the increasing severity of the shocks encountered in road travel.

It is often important and desirable, therefore, from the point of view both of driving safety and proper vehicle maintenance that a dealer in automotive shock absorbers have available a demonstration and test apparatus which will enable him to visually display the operation of an ineffective shock absorber to a prospective customer by contrasting its ineffective performance with the performance of a properly functioning shock absorber. Additionally, it may be necessary to offer a comparison between a customer's shock absorber and a properly functioning one in order to convince a motorist of the need for replacing his worn out shock absorbers.

Shock absorber demonstration stands of the prior art have generally been characterized by the provision of spring biased lever arms to which one end of a shock absorber is fixed. The other end of the shock absorber is attached to a stationary portion of the stand. These devices are operable to compress the spring and shock absorber and are so arranged as to permit the shock absorber to extend under the influence of the spring upon release of the lever arm.

The present invention provides in a preferred embodiment a shock absorber demonstration stand equipped with means for simultaneously compressing two or more shock absorbers and is capable of subjecting the shock absorbers to nearly identical compressive forces thereby increasing the accuracy and reliability of the demonstration. Furthermore, the present invention provides a demonstration arrangement wherein the disparity between the operation of an effective shock absorber and that of a relatively ineffective one are visually accentuated in such a manner that an operational comparison can be made by observation of a single structural element on the stand. Use of the demonstration stand of this invention will, therefore, enable a prospective purchaser to more easily detect even small differences in the functioning of a pair of shock absorbers than could be detected by using the stands of the prior art.

SUMMARY OF THE INVENTION

An embodiment of the demonstration stand of the present invention consists chiefly in the provision of a supporting frame having a base which is formed to be securely fastened to a stationary surface. Two or more rigid posts are attached to the base to extend generally at right angles to the plane in which the base is located. Suitable means for mounting one end of one or more shock absorbers are provided on the base such that, when the shock absorbers are mounted, they may be maintained substantially parallel to the posts. To the other ends of the posts there is fixed in a secure manner a head member which serves to carry a lever arm and which acts as an abutment for the lever arm when the arm is in an unactuated position. A movable bar element provided with means for engaging the other ends of shock absorbers is disposed immediately beneath the lever arm and rests on the end of a helical coil spring which urges the bar against the lever arm thereby holding the lever arm in an unactuated position. The other end of the spring may, if desired, engage the base of the frame. The bar element and the spring are so disposed as to be guided by one or more of the posts upon actuation of the lever arm in compressing the spring and shock absorbers mounted on the stand.

Having compressed the spring and shock absorbers as far as possible, an operator of the device may release the lever arm and observe the speed with which the shock absorbers return to their uncompressed state under the influence of the helical coil spring.

The apparatus of the present invention permits a user of the device to readily compare the rates of rebound of two shock absorbers both of which have one end attached to the bar element at spaced points. This is achieved merely by noting the angle at which the bar element is tilted from the horizontal as the two shock absorbers resume their uncompressed dimensions. Since a properly functioning shock absorber will extend itself gradually and a defective one relatively rapidly, the degree of tilt observed will immediately indicate not only that a shock absorber is malfunctioning but also the degree of disparity between its operation and the operation of an effective shock absorber.

It will be seen, then, that the demonstration stand of this invention greatly facilitates visual comparison of the operation of shock absorbers by enabling an individual to observe the movement of a single element on the stand as opposed to requiring observation of two independently functioning shock absorbers.

Accordingly, it is a principal object of this invention to provide a demonstration stand which simulates the actual operation of a shock absorber by providing a compression cycle and a rebound cycle which are observable by a user of the device.

A further object is to enable accurate comparison to be made during the rebound cycle between the operation of a properly functioning shock absorber and one that is relatively less effective.

Another object of this invention is to provide a stand structure wherein nearly identical compressive forces are applied to a plurality of shock absorbers mounted thereon.

A still further object is to provide a demonstration stand arrangement where the mounted shock absorbers will undergo approximately the same force tending to restore them to their uncompressed state.

BRIEF DESCRIPTION OF THE DRAWINGS

Other objects and attendant advantages of the present invention will become apparent as consideration is given to the following detailed description in connection with the accompanying drawings in which like referenced numerals designate like parts throughout the figures and wherein:

FIG. 1 is a perspective view of the apparatus of this invention;

FIG. 2 is a detailed perspective view of the apparatus of this invention with parts broken away to better shown the disposition of details hereinafter referred to;

FIG. 3 is a front elevational view showing the lever arm in an actuated position; and FIG. 4 is the same view as FIG. 3, but showing the lever arm in its unactuated position.

DETAILED DESCRIPTION OF THE INVENTION

Referring now to the drawings, there is shown in FIG. 1 an embodiment of the shock absorber demonstration stand of the present invention, generally indicated at 10, which is adapted to demonstrate the operation of two shock absorbers 12 and 13 mounted thereon.

The stand 10 includes a supporting frame consisting of a base portion 14 which may be formed by connecting a rigid metal bar element 16 to another bar element 18 of like material at approximately the midpoint of bar element 18. Suitable means, such as apertures 20, are provided to permit the base portion 14 to be securely fastened by means of bolts 21 to a stationary surface 22 such as the top of a storage cabinet.

The supporting frame further includes an upright member 23 extending perpendicularly from bar element 16 and securely engaging, by welding, for example, the upwardly facing side of bar element 16 at a point spaced from bar element 18.

Two upright posts 24 and 25 are provided which engage bar element 18 adjacent its midpoint and extend in planes generally parallel to upright member 23. The posts 24 and 25 may be attached by welding and are spaced from each other a distance approximately equal to the width of bar element 18. For the purpose of maintaining the spatial relation, the posts 24 and 25 may be formed from one piece of metal stock material and bent to form a U-shaped member where the posts 24 and 25 are the legs with the closed end functioning as a spacer at 26.

Referring now to FIG. 2 of the drawings, there is illustrated the disposition of parts forming a head member generally designated at 27. The head member 27 includes a first crossbar element 28 provided at its ends with inwardly turned, apertured flanges 30 and 31. Crossbar 28 is rigidly attached at its midsection to the upper end of upright member 23 and extends transversely thereof. A second crossbar element 32 is securely attached about its midpoint to the spacer portion 26 to lie substantially in a horizontal plane parallel to bar element 18.

A cover 34 having sidewalls 36 and 38 is provided to be mounted through apertures in the sidewalls at one end on flanges 30 and 31 and at its other end on cross bar 32 by means of bolts threaded through apertures suitably located on cover 34 and crossbar 32. The cover 34, thus disposed, serves to maintain upright member 23 and posts 24 and 25 generally parallel to each other when the demonstration stand is put to use.

In assembly of the demonstration stand, before bar element 18 or crossbar 32 is set in place, a helical coil spring 40 is disposed about the posts 24 and 25. The selection of the coil spring 40 should be determined, of course, by the type of shock absorber that will be mounted on the stand with a view to achieving proper operation of the apparatus analogous to the functioning of an automobile suspension system.

One end of coil spring 40 engages bar element 18; the other end engages the underside of a movable bar element 42 adjacent its midsection and which is disposed to extend between posts 24 and 25. Bar element 42 is provided proximate its midpoint with guide notches 44 and 46 which slidably engage posts 24 and 25, respectively. Apertures 47 and 48 or other suitable means are provided at each end of bar element 42 to engage the ends of shock absorbers. The connection between the bar element 42 and the end of each shock absorber should be such that bar element 42 is free to pivot about a horizontal axis through each connection. In the present embodiment, the shock absorbers are provided with axial studs 45 which are disposed through apertures 47 and 48. Resilient spacers 51 and 53 serve to engage bar element 42 and transmit motion to the shock absorber. The diameters of the axial studs are smaller than the diameters of the apertures 47 and 48 to enable bar element 42 to pivot out of the horizontal plane normally occupied by it. The other ends of the shock absorbers are mounted on bar element 18 by means of brackets 49 and 50 disposed in vertical alignment with the mounting means on bar element 42 so that the shock absorbers may assume a generally upright position perpendicular to bar element 18. Additionally, the mounting means on bar element 18 and movable bar element 42 are spaced equidistantly from the midpoints of each bar element to thus evenly distribute the restoring force of coil spring 40 in the operation of the stand.

An actuating mechanism is provided in the form of a U-shaped lever arm 52 having one leg 54 pivotally linked by bolt 57 to the inside face of flange 30 and the other leg 55 similarly linked by bolt 58 to flange 31 so that the lever arm 52 may pivot about a horizontal axis. Legs 54 and 55 are disposed to extend between and transversely of movable bar element 42 and crossbar 32. The closed end of the U-shaped lever arm 52 serves as a handle 56. The material used in making the lever arm 52 should be strong enough so that repeated use will not noticeably bend or twist the legs 54 and 55 to result in uneven contact with movable bar element 42.

The operation of the shock absorber demonstration stand will now be described. FIG. 2 illustrates the disposition of parts when the lever arm 52 is in an unactuated position. Coil spring 40 maintains movable bar element 42 in contact with the lower sides of legs 54 and 55 and thereby urges the upper sides of legs 54 and 55 into contact with the underside of crossbar element 32.

With the base bar elements 16 and 18 suitably secured to a stationary surface, a user may grasp handle 56 and pivot lever arm 52 downwardly toward bar element 18 to carry out the compression cycle wherein movable bar element 42 rides along posts 24 and 25 to compress coil spring 40 as well as the shock absorbers 12 and 13 mounted on the stand.

FIG. 3 illustrates the disposition of parts at the end of the compression cycle when the lever arm 52 is held in an actuated position. The travel of the lever arm 52 and movable bar element 42 is limited, of course, by the extent to which the mounted shock absorbers can be compressed.

To initiate the rebound cycle, after having compressed the shock absorbers as far as desired, a user may either move lever arm 52 back it its unactuated position manually or simply release it. As shown in FIG. 4, the lever arm 52 has been manually moved back to its unactuated position and is out of contact with movable bar element 42.

FIG. 4 illustrates the operation of the coil spring 40 on shock absorbers 12 and 13 mounted on the stand while the rebound cycle is in progress. It can be seen that the restoring force of coil spring 40 will be transmitted to shock absorbers 12 and 13 in substantially equal amounts by virtue of the utilization and disposition of movable bar element 42.

It should be noted in FIG. 4 that there is illustrated a stop-action view of the operation of the stand wherein shock absorber 12 is represented as functioning more effectively than shock absorber 13 in that, under the influence of approximately the same restoring force, shock absorber 12 effectively resists the extension force exerted upon it by the coil spring 40 whereas, at the same instant of time, shock absorber 13 is represented as having noticeably less resistance to extension manifested by its greater degree of elongation. As a result of the more rapid extension of shock absorber 13, movable bar element 42 will be tilted out of its horizontal plane indicating thereby to an observer the difference in the rates of rebound of the two shock absorbers.

It will be appreciated, therefore, that the structure of the stand of the present invention graphically displays and accentuates the difference in operation between an effective shock absorber device and one that is relatively less effective. By simply observing the angular disposition of movable bar element 42 as the coil spring 40 resumes its uncompressed position, a user of the stand can be made aware of even small differences in the damping effectiveness of the shock absorbers mounted on the stand.

It will be appreciated that the principle of the present invention may readily be adapted to a demonstration stand where the shock absorbers are mounted to be elongated against the restoring force of a spring as opposed to being compressed as in the embodiment described above.

Clearly many other modifications of the above-described embodiment are possible and may be resorted to by those skilled in the art without departing from the spirit and scope of the present invention as set forth in the appended claims.

What is claimed is:

1. A demonstration stand for visually comparing the damping action of shock absorbers and like devices comprising support means having first and second means spaced thereon for mounting one end of a first shock absorber and one end of a second shock absorber in visual proximity to one another, a linking member mounted on said support means for movement through a distance relative to said first and second means between a first and second position, said linking member having spaced thereon third means associated with said first means and fourth means associated with said second means for mounting the other ends of a first and second shock absorber respectively, actuating means mounted on said support means for movement between deactuated and actuated positions and operatively connected with said linking member for moving said linking member from said first position toward said second position so that said other ends of said shock absorbers will be moved at substantially the same rate through said distance, and spring means acting between said support means and said linking member to provide substantially equal components of force to said third and fourth means while constantly urging said linking member toward said first position so that upon release of said actuating means, said other ends of said shock absorbers will move back through said distance at different rates thereby exhibiting the respective damping action of said shock absorbers by resisting movement of said linking member by said spring means.

2. A demonstration stand for visually comparing the damping action of shock absorbers or like devices comprising support means having one end of a relatively effective shock absorber and one end of a relatively ineffective shock absorber mounted thereon in visual proximity to one another, a linking member mounted on said support means for movement through a distance relative to said one end of each of said shock absorbers between a first and second position, the other ends of said shock absorbers being connected to said linking member at spaced points thereon, actuating means mounted on said support means for movement between deactuated and actuated positions and operatively connected with said linking member for moving said linking member from said first position toward said second position so that said other ends of said shock absorbers will be moved at substantially the same rate through said distance and spring means acting between said support means and said linking member to provide a restoring force for constantly urging said linking member toward said first position, said restoring force being distributed in substantially equal proportions through said linking member to said shock absorbers so that, upon release of said actuating means, said other end of said relatively ineffective shock absorber will move back through said distance at a rate greater than that of said other end of said relatively effective shock absorber.

3. The demonstration stand of claim 1 wherein said support means comprises a base member, a plurality of upright members attached at one end to said base member, and a head member attached to the other ends of said upright members.

4. The demonstration stand of claim 3 wherein said spring means comprises a helical coil spring disposed about at least one of said upright members, said helical coil spring having one end engaging said base member and the other end engaging said linking member.

5. The demonstration stand of claim 3 wherein said actuating means comprises a lever arm pivotally connected at one end to said head member and disposed to extend between said head member and said linking member, said lever arm terminating at its free end with a hand grip.

6. The demonstration stand of claim 5 wherein said lever arm comprises a U-shaped member having two leg elements and a closed end, each of said leg elements being pivotably attached to said head member so that said leg elements will simultaneously engage said linking member at two spaced points thereon.

7. The demonstration stand of claim 6 wherein said linking member comprises a flat bar member disposed substantially transverse of said upright members and engaging adjacent its midpoint said other end of said helical coil spring.

8. The demonstration stand of claim 6 wherein said head member abuts said legs of said lever arm when said lever arm is in a deactuated position.

9. The demonstration stand of claim 7 wherein said flat bar member is provided adjacent its midpoint with outwardly facing notches for slidably engaging said upright members.

* * * * *